(12) United States Patent
Nishimura et al.

(10) Patent No.: US 6,396,650 B1
(45) Date of Patent: May 28, 2002

(54) LENS DRIVING APPARATUS

(75) Inventors: Syunji Nishimura, Omiya; Masaya Nozawa, deceased, late of Omiya; by Mieko Nozawa, legal representative, Saitama; Yukio Noguchi, Omiya, all of (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/820,798

(22) Filed: Mar. 30, 2001

(51) Int. Cl.[7] .............................. G02B 7/02; G02B 15/14
(52) U.S. Cl. ........................ 359/826; 359/696; 359/698
(58) Field of Search .................................. 359/822, 823, 359/824, 826, 696, 694, 697, 698, 704, 706; 396/75, 85, 348, 349

(56) References Cited

U.S. PATENT DOCUMENTS

| | | | |
|---|---|---|---|
| 5,594,589 A | * 1/1997 | Chen | 359/826 |
| 5,689,739 A | 11/1997 | Yoshida et al. | 396/83 |
| 5,699,199 A | 12/1997 | Cho et al. | 359/698 |
| 5,896,234 A | * 4/1999 | Miyamoto et al. | 359/819 |
| 5,982,566 A | 11/1999 | Nishimura et al. | 359/822 |
| 6,091,900 A | * 7/2000 | Kaneda et al. | 396/55 |
| 6,163,412 A | * 12/2000 | Onda | 359/694 |
| 6,201,650 B1 | * 3/2001 | Joans et al. | 359/819 |
| 6,288,848 B1 | * 9/2001 | Shinohara et al. | 359/696 |

FOREIGN PATENT DOCUMENTS

| | | |
|---|---|---|
| JP | 9-49958 | 2/1997 |
| JP | 11-64708 | 3/1999 |
| JP | 11-231199 | 8/1999 |

* cited by examiner

*Primary Examiner*—Georgia Epps
*Assistant Examiner*—Saeed Seyrafi
(74) *Attorney, Agent, or Firm*—Leydig, Voit & Mayer, Ltd.

(57) ABSTRACT

A lens driving apparatus includes an intermediate barrel expandable and collapsible in an optical axis direction, for moving a rear lens group in the optical axis direction along with expanding and collapsing; a movable barrel, concentric with the intermediate barrel, expandable and collapsible with respect to the intermediate barrel along with the expanding and collapsing of the intermediate barrel, for moving a front lens group in the optical axis direction when expanding from the intermediate barrel; and a click ball for holding the front lens group when the movable barrel collapses, so as to move the front lens group together with the intermediate barrel. As a consequence, when the movable barrel collapses, the front lens group can be held and moved together with the intermediate barrel so the focus can be adjusted appropriately, and the apparatus can be made smaller at a lower cost.

6 Claims, 6 Drawing Sheets

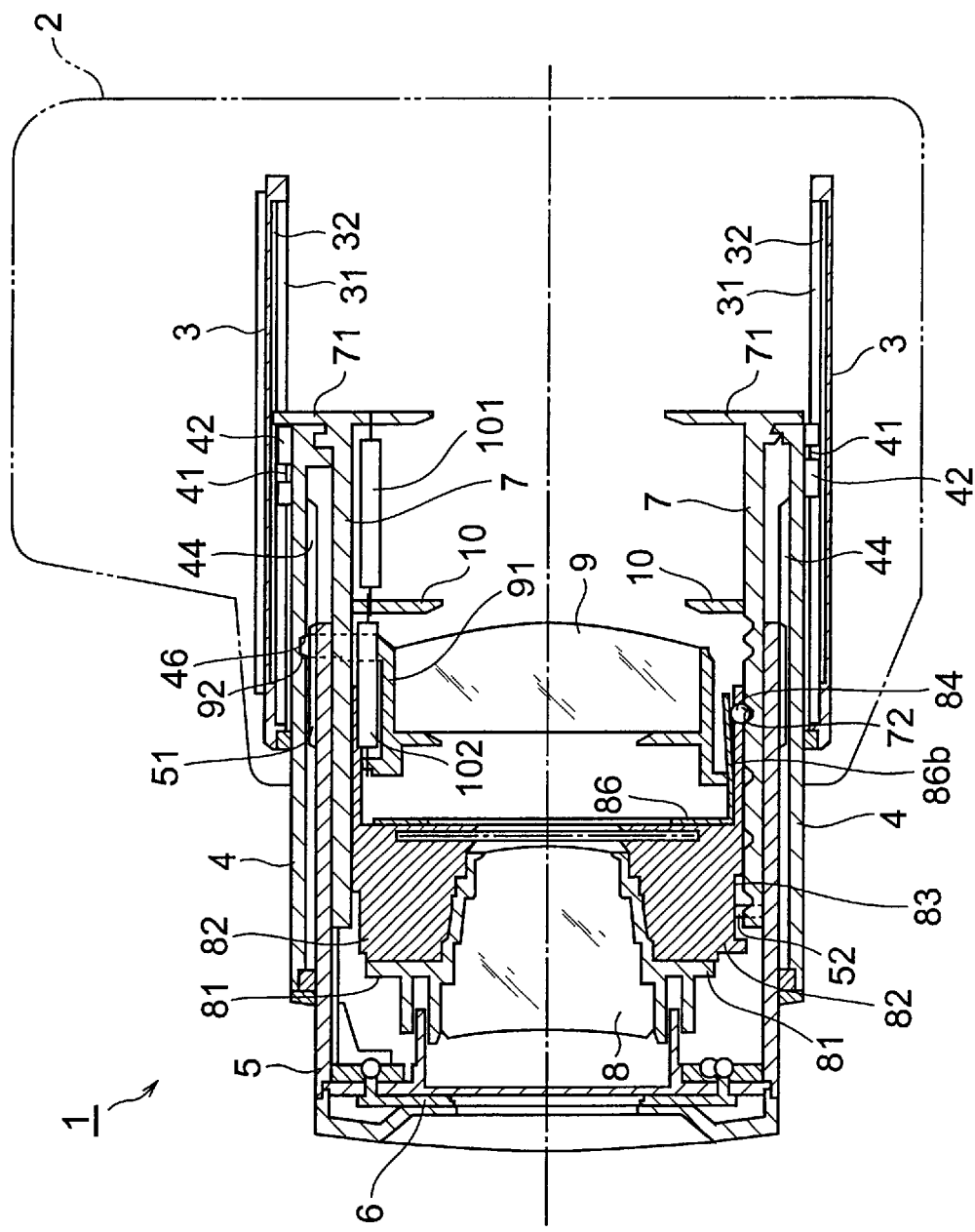

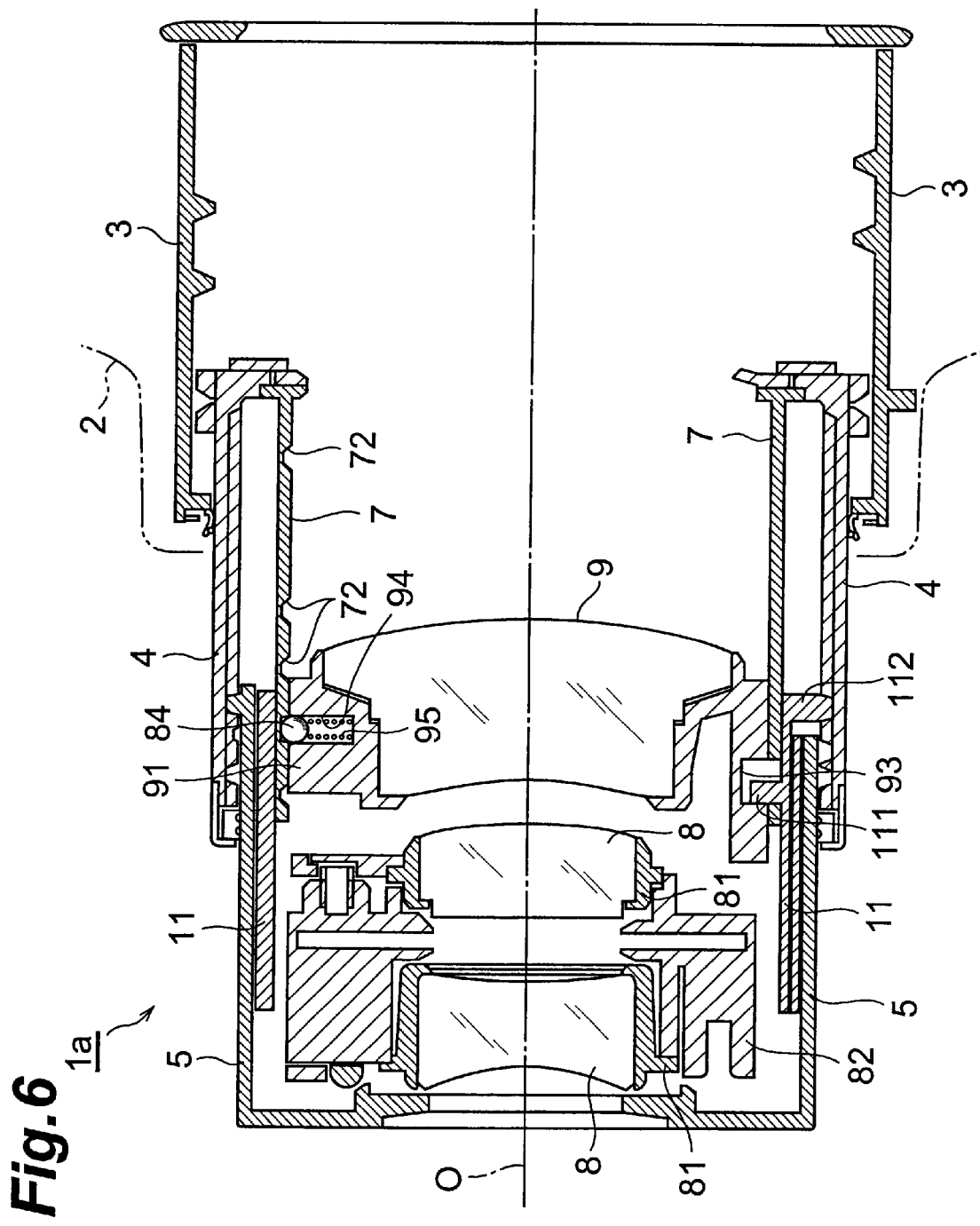

LENS DRIVING APPARATUS

BACKGROUND OF THE INVENTION

1. Field of the Invention

The present invention relates to a lens driving apparatus used in an optical instrument such as a camera.

2. Related Background Art

A conventionally known lens driving apparatus in an optical instrument such as a camera comprises a plurality of lens barrels which telescopically expand from a camera body, and front and rear lens groups arranged therein, in which the front and rear lens groups are appropriately moved along the optical axis as the lens barrels expand or collapse, changing magnification and adjusting focus. For example, a lens driving apparatus in which a cam ring rotating about the optical axis holds front and rear lens groups by way of respective cam grooves different from each other and rotates so as to move the front lens group and rear lens group according to the forms of cam grooves has been disclosed in Japanese Patent Application Laid-Open No. HEI 9-49958.

In this lens driving apparatus, the cam groove for the rear lens group has a width greater than that of the cam follower of the rear lens group, so that the rear lens group moves in conformity to the cam groove when the cam ring rotates normally, whereas the width of cam groove prevents the rear lens group from moving when the cam ring rotates in reverse, so as to adjust the focus as appropriate.

In the lens driving apparatus disclosed in the above-mentioned publication, however, there is a fear of the rear lens group moving at the time of focus adjustment without being sufficiently held. Therefore, if an external force such as shock acts thereon, then the position of rear lens group may shift, whereby the focus adjustment may not be carried out appropriately.

For overcoming such a problem, there has been proposed, as disclosed in Japanese Patent Application Laid-Open No. HEI 11-64708, a lens barrel for expanding an intermediate barrel and a movable barrel from a camera body, in which a cam barrel moving together with the intermediate barrel is disposed inside the intermediate barrel. In this lens barrel, the front lens group is held by the movable barrel, the rear lens group is held by the cam barrel by way of a cam groove, and a special gear is provided for transmitting a rotational force from the intermediate barrel to the cam barrel at the time of normal rotation without transmitting the rotational force at the time of reverse rotation. Therefore, the rear lens group can sufficiently be held by way of the cam barrel and cam groove even at the time of focus adjustment due to the gear in mesh.

However, this lens barrel is problematic in that the lens driving apparatus increases its size and cost since it necessitates the cam barrel and rotation transmitting mechanism as components constituting its lens driving mechanism.

SUMMARY OF THE INVENTION

In order to overcome such problems, it is an object of the present invention to provide a lens driving apparatus which can carry out appropriate focus adjustment, and can be made smaller at a lower cost.

For achieving such an object, in a first aspect, the present invention provides a lens driving apparatus for moving at least two lens groups composed of first and second lenses along an optical axis so as to change a magnification and adjust a focus, the lens driving apparatus comprising a first barrel, disposed so as to be expandable and collapsible in an optical axis direction, for moving the first lens in the optical axis direction along with expanding and collapsing thereof; a second barrel, disposed concentric with the first barrel while being expandable and collapsible with respect to the first barrel along with the expanding and collapsing of first barrel, for moving the second lens in the optical axis direction when expanding from the first barrel; and holding means for holding the second lens when the second barrel is switched from expanding to collapsing, so as to move the second lens together with the first barrel.

In a second aspect, the present invention provides a lens driving apparatus for moving at least two lens groups composed of first and second lenses along an optical axis so as to change a magnification and adjust a focus, the lens driving apparatus comprising a first barrel, disposed so as to be expandable and collapsible in an optical axis direction, for moving the first lens in the optical axis direction along with expanding and collapsing thereof; a second barrel, disposed concentric with the first barrel while being expandable and collapsible with respect to the first barrel along with the expanding and collapsing of first barrel, for moving the second lens in the optical axis direction when collapsing into the first barrel; and holding means for holding the second lens when the second barrel is switched from collapsing to expanding, so as to move the second lens together with the first barrel.

In a third aspect, the present invention provides a lens driving apparatus for moving at least two lens groups composed of first and second lenses along an optical axis so as to change a magnification and adjust a focus, the lens driving apparatus comprising a first barrel, disposed so as to be expandable and collapsible in an optical axis direction, for moving the first lens in the optical axis direction along with expanding thereof; a second barrel, disposed concentric with the first barrel while being expandable and collapsible with respect to the first barrel along with the expanding and collapsing of first barrel, for moving the second lens in the optical axis direction when expanding and collapsing with respect to the first barrel; and holding means for holding the first lens when the first barrel is switched from expanding to collapsing, so as to move the first lens together with the first barrel.

In a fourth aspect, the present invention provides a lens driving apparatus for moving at least two lens groups composed of first and second lenses along an optical axis so as to change a magnification and adjust a focus, the lens driving apparatus comprising a first barrel, disposed so as to be expandable and collapsible in an optical axis direction, for moving the first lens in the optical axis direction along with collapsing thereof; a second barrel, disposed concentric with the first barrel while being expandable and collapsible with respect to the first barrel along with the expanding and collapsing of first barrel, for moving the second lens in the optical axis direction when expanding and collapsing with respect to the first barrel; and holding means for holding the first lens when the first barrel is switched from collapsing to expanding, so as to move the first lens together with the first barrel.

In the lens driving apparatus in accordance with the present invention, the holding means may comprise an engaging member having a spherical part, and urging means for pressing the spherical part of the engaging member against a movable member moving together with the first barrel, so as to hold the first or second lens by causing the spherical part to engage a groove formed in the movable member.

In the lens driving apparatus in accordance with the present invention, the movable member may be a straight member attached to the first barrel and adapted to move in the optical axis direction together with the first barrel.

Since the present invention comprises holding means for holding the first or second lens so as to move it together with the first barrel when the movement of the first or second barrel is reversed, the distance between the first and second lenses can be changed between the expanding and collapsing of the first and second barrels, whereby the focus can be adjusted. If this holding means is configured so as to accompany an existing component, then the number of components employed for changing the magnification and adjusting the focus can be reduced, whereby the apparatus as a whole can be made smaller at a lower cost.

BRIEF DESCRIPTION OF THE DRAWINGS

FIG. 5 is an explanatory view for actions of the lens driving apparatus of FIG. 1; and FIG. 6 is an explanatory view of the lens driving apparatus in accordance with a second embodiment.

DESCRIPTION OF THE PREFERRED EMBODIMENTS

Figure 1:
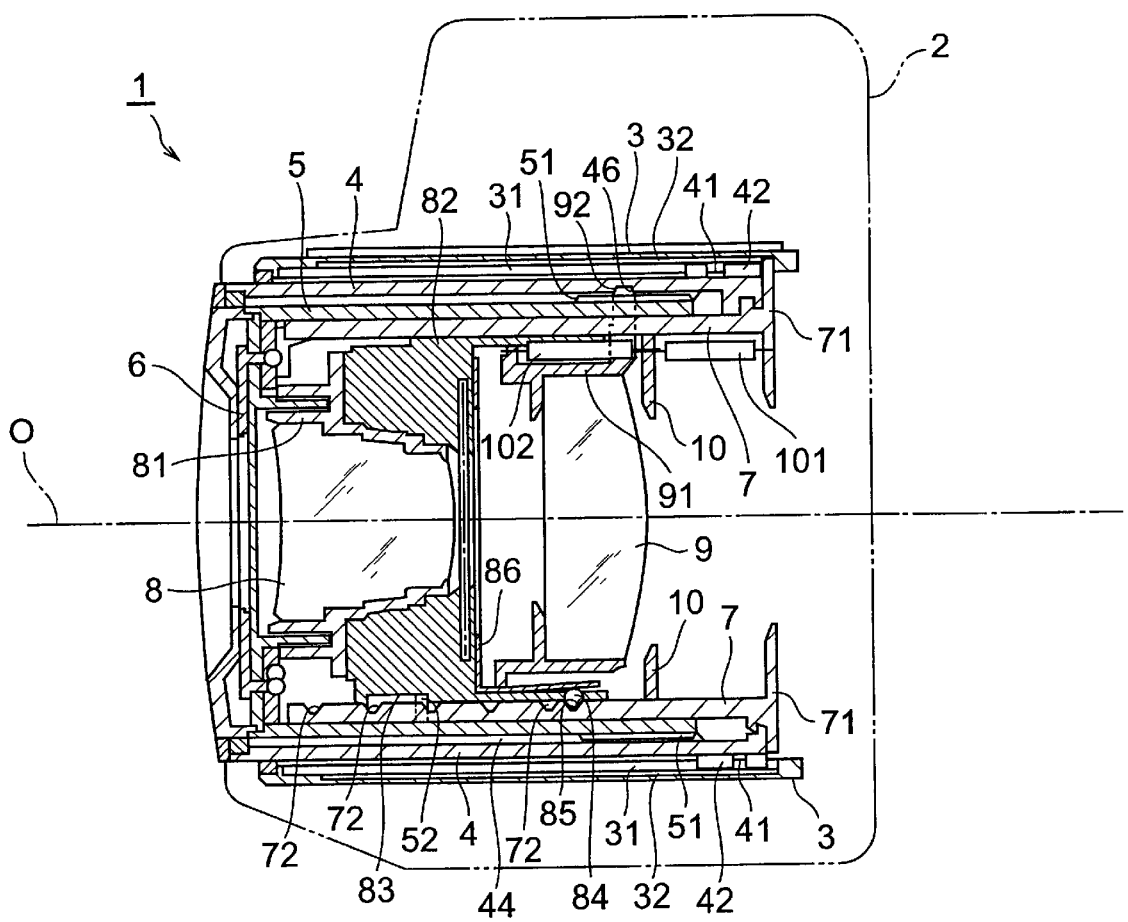
FIG. 1 is an explanatory view of the lens driving apparatus in accordance with a first embodiment of the present invention.

In the following, various embodiments of the present invention will be explained with reference to the accompanying drawings. Among the drawings, constituents identical to each other will be referred to with numerals identical to each other without repeating their overlapping explanations. The sizes and proportions in the drawings do not always match those explained.

First Embodiment

Figure 2:
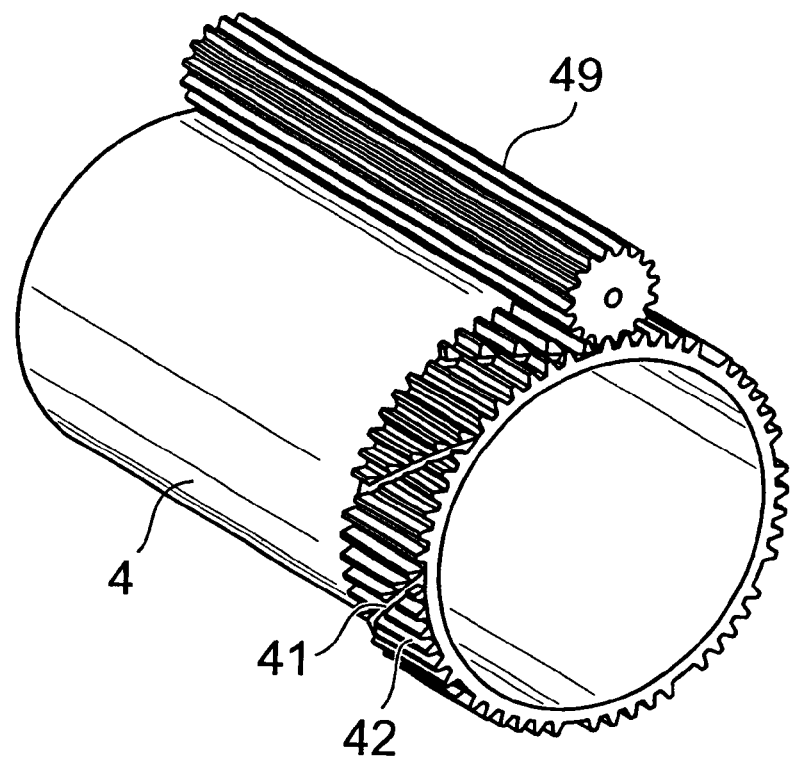
FIG. 2 is an explanatory view of the intermediate barrel and the like in the lens driving apparatus of FIG. 1.

FIG. 1 shows a lens driving apparatus 1 in accordance with a first embodiment. As shown in FIG. 1, the lens driving apparatus 1 is used in a taking optical system of a camera, and comprises an intermediate barrel 4 and a movable barrel 5 which are expandable from and collapsible into a camera body 2. The intermediate barrel 4 is a barrel which is open at both ends, and is contained in a fixed barrel 3 installed in the camera body 2. The outer peripheral surface of a rear portion of the intermediate barrel 4 is formed with helicoid threads 41 and gear teeth 42. For example, as shown in FIG. 2, helicoid threads 41 are formed as helical protrusions and recesses in the outer peripheral surface of intermediate barrel 4, whereas a number of gear teeth 42 are formed between the protrusions of helicoid threads 41 along the outer periphery.

The helicoid threads 41 are in mesh with helicoid threads 31 formed in the inner peripheral surface of fixed barrel 3. The gear teeth 42 are in mesh with a columnar gear 49 disposed adjacent the intermediate barrel 4. Consequently, as the gear 49 rotates, the intermediate barrel 4 rotates about an optical axis O by way of the gear teeth 42. As the intermediate barrel 4 rotates, it moves along the optical axis O relative to the fixed barrel 3 since the helicoid threads 41 and 31 are in mesh.

The intermediate barrel 4 contains the movable barrel 5 therein. The movable barrel 5 is a barrel which is movable along the optical axis O as with the intermediate barrel 4, and is arranged concentric with the intermediate barrel 4 about the optical axis O. Attached to a front end portion of the movable barrel 5 is a barrier 6 which is adapted to open and close. The outer peripheral surface of a rear portion of the movable barre 15 is formed with helicoid threads 51 which are helical protrusions and recesses. The helicoid threads 51 are in mesh with helicoid threads 44 formed in the inner peripheral surface of intermediate barrel 4.

The movable barrel 5 is engaged with a straight barrel 7, so as to be prevented from rotating about the optical axis O while being allowed to move only linearly along the optical axis O. Therefore, if the intermediate barrel 4 rotates, then the movable barrel 5 moves along the optical axis O relative to the intermediate barrel 4 since the helicoid threads 44 and 51 are in mesh.

The straight barrel 7 is a barrel disposed inside the movable barrel 5 and forms a key part 71 in a rear end portion thereof. The key part 71 is engaged with a longitudinal groove 32 formed in the inner peripheral surface of fixed barrel 3. As a consequence, the straight barrel 7 is prevented from rotating about the optical axis O while being allowed to move only linearly along the optical axis O.

The rear end portion of straight barrel 7 is engaged with the intermediate barrel 4, while allowing the intermediate barrel 4 to rotate. Consequently, the straight barrel 7 linearly moves as the intermediate barrel 4 moves in the optical axis direction.

A front lens group 8 and a rear lens group 9 are disposed inside the straight barrel 7. The front lens group 8 and rear lens group 9 are lens groups constituting a zoom lens optical system.

The rear lens group 9 is attached to a rear group lens frame 91. The rear group lens frame 91 is engaged with the straight barrel 7 so as to be slidable in the optical axis direction. The rear group lens frame 91 forms a cam follower 92 which projects outward from its side portion. The cam follower 92 penetrates through the straight barrel 7 and movable barrel 5, so as to be inserted into a cam groove 46 formed in the inner peripheral surface of intermediate barrel 4. Therefore, as the intermediate barrel 4 rotates or moves, the rear lens group moves along the optical axis O while tracking the cam groove 46.

The front lens group 8 is attached to a front group lens frame 81. The front group lens frame 81 is connected to a shutter unit 82, so as to move together with the shutter unit 82. The shutter unit 82 is attached to the straight barrel 7 so as to be slidable in the optical axis direction.

The side face of shutter unit 82 is formed with a groove 83 extending in the optical axis direction. Inserted into the groove 83 is a lug 52 projecting from the inner wall of movable barrel 5. As a consequence, the shutter unit 82 and front lens group 8 are movable relative to the movable barrel 5 by a distance corresponding to the forming length of the groove 83.

Click balls 84 are installed in the shutter unit 82. Each click ball 84 is a ball for moving the front lens group 8 together with the intermediate barrel 4, and is disposed inside a respective installation hole 85 penetrating through a rear portion of the shutter unit 82. Also installed in the shutter unit 82 is a pressing member 86. The pressing member 86 is an urging means for urging the click balls 84 outward. The pressing member 86 will be explained later in detail. For moving the front lens group 8 together with the intermediate barrel 4, not only the click ball 84, which is a sphere, but also a pin having a spherical portion at its tip and the like may be used.

The inner face of straight barrel 7 is formed with recesses 72 for engaging the click balls 84. A plurality of recesses 72 are formed at predetermined intervals along the optical axis direction.

A movable mask 10 is disposed inside the straight barrel 7. The movable mask 10 is attached to the straight barrel 7 so as to be movable in the optical axis direction, while being urged by a spring 101 toward the proximal end. A spring 102 is disposed between the movable mask 10 and rear group lens frame 91, so as to urge the rear group lens frame 91 toward the proximal end.

Figure 3:
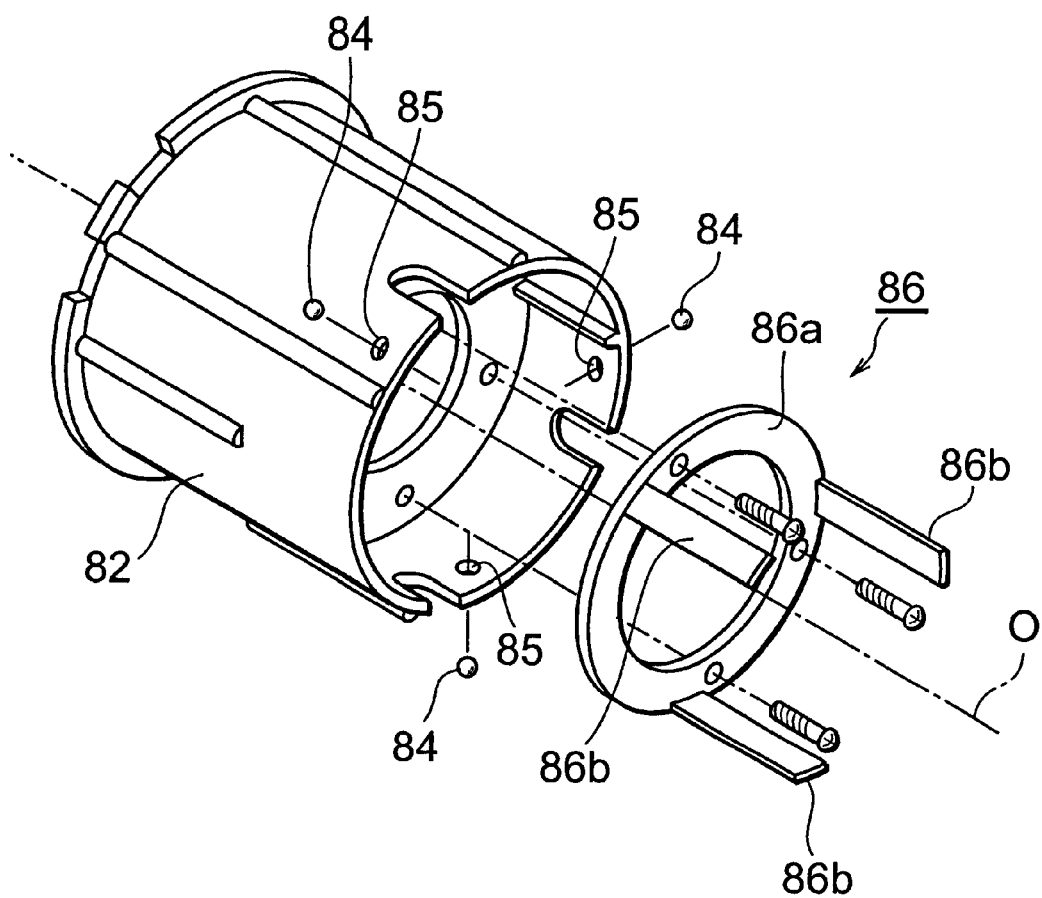
FIG. 3 is an explanatory view of the pressing member and click balls in the lens driving apparatus of FIG. 1.

FIG. 3 is an explanatory view showing the pressing member and click balls.

As depicted, the pressing member 86 has an annular ring portion 86 and three sheet-like pressing portions 86b extending from the ring portion 86a. The pressing member 86 is disposed such that each of the pressing portions 86b abuts against the inner wall of shutter unit 82 when the ring portion 86a is screwed onto the rear portion of shutter unit 82. The installation holes 85 are open at respective positions of the side wall of shutter unit 82 where the pressing portions 86 are located, so as to accommodate their corresponding click balls 84. As a consequence, the shutter unit 82 is supported by three points with respect to the straight barrel 7 by way of the click balls 84.

Actions of the lens driving apparatus in accordance with this embodiment will now be explained.

At WIDE waiting time, as shown in FIG. 1, the intermediate barrel 4 is collapsed in the fixed barrel 3, whereas the movable barrel 5 is collapsed in the intermediate barrel 4. If the zoom switch of camera body 2 is operated in this state, then the intermediate barrel 4 normally rotates about the optical axis O as the gear 49 rotates. Consequently, since the helicoid threads 41 and 31 are in mesh, the intermediate barrel 4 moves forward along the optical axis O relative to the fixed barrel 3.

Figure 4:
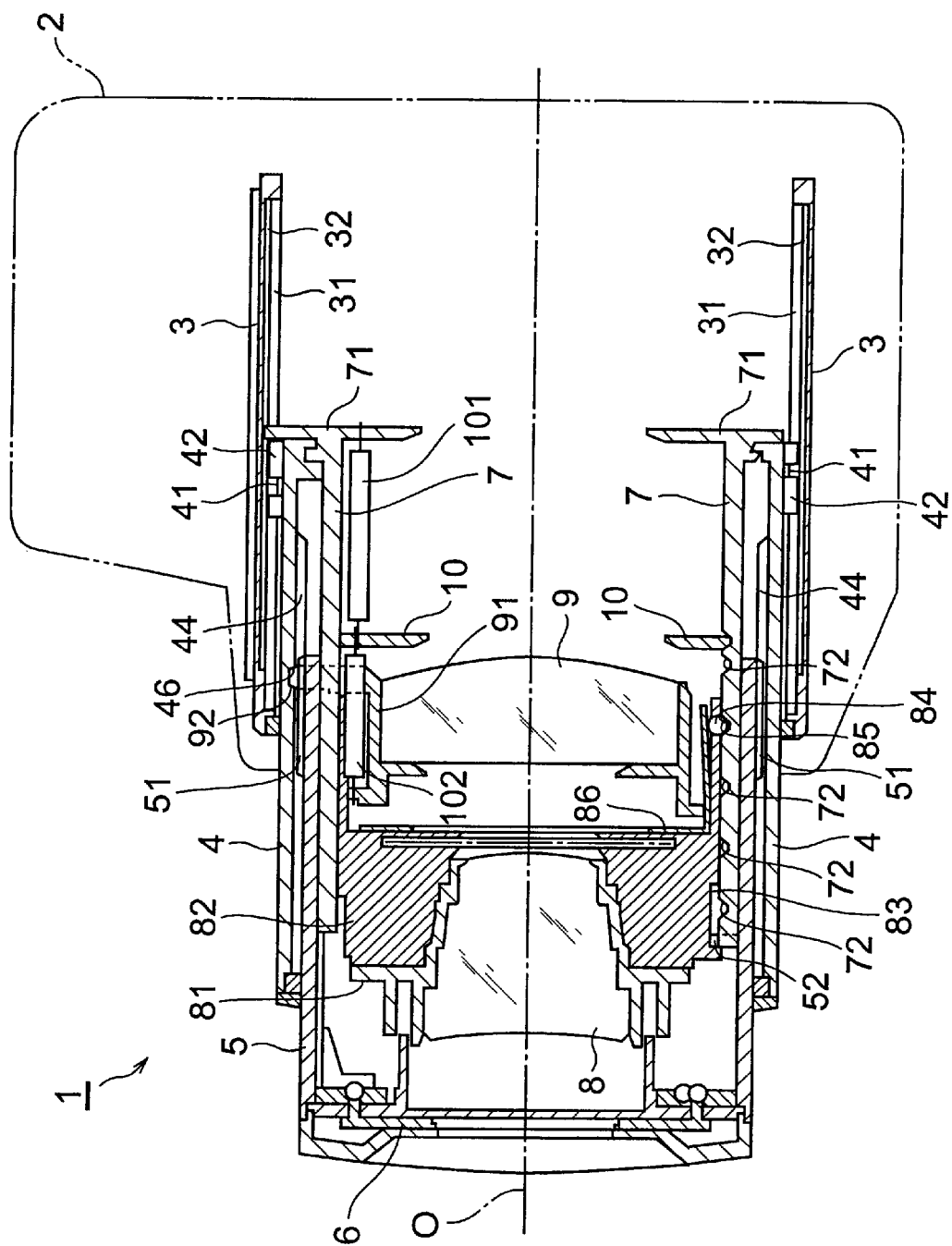
FIG. 4 is an explanatory view for actions of the lens driving apparatus of FIG. 1.

Then, as the intermediate barrel 4 rotates and moves, the rear lens group 9 moves along the optical axis O while tracking the cam groove 46 as shown in FIG. 4. Since the helicoid threads 44 and 51 are in mesh, the movable barrel 5 moves forward along the optical axis O relative to the intermediate barrel 4. Further, since the shutter unit 82 is pushed by the lug 52 of movable barrel 5, the front lens group 8 moves along the optical axis O together with the movable barrel 5.

Thus, if the intermediate barrel 4 is rotated, then the rear lens group 9 can be moved in the optical axis direction according to the movement of intermediate barrel 4 and the formation of cam groove 5, and the front lens group 8 can be moved in the optical axis direction according to the movement of movable barrel 5. As a consequence, zooming can be carried out in the taking optical system constituted by the front lens group 8 and rear lens group 9.

Meanwhile, there is a case where, as the intermediate barrel 4 rotates and moves, the shutter unit 82 moves relative to the straight barrel 7, whereby the click balls 84 pass the positions of recesses 72 in the straight barrel 7. In this case, the click balls 84 move beyond the recesses 72 without falling into the latter.

If the shutter button of camera body 2 is operated in the state of FIG. 4, then the intermediate barrel 4 rotates in reverse about the optical axis O according to the distance to an object. Therefore, since the helicoid threads 41 and 31 are in mesh, the intermediate barrel 4 retracts along the optical axis O relative to the fixed barrel 3.

As the intermediate barrel 4 retracts, the rear lens group 9 moves along the optical axis O while tracking the cam groove 46 as shown in FIG. 5. Since the helicoid threads 44 and 51 are in mesh, the movable barrel 5 moves rearward along the optical axis O relative to the intermediate barrel 4.

At this time, since the click balls 84 of shutter unit 82 fit within the respective recesses 72 of straight barrel 7 and are pressed with the pressing member 86, they would not easily come off the recesses 72. Therefore, the shutter unit 82 moves together with the straight barrel 7. Hence, the front lens group 8 moving together with the shutter unit 82 would move together with the straight barrel 7 and intermediate barrel 4.

Thus, since the intermediate barrel 4 rotates in reverse according to the distance to the object, the rear lens group 9 can be moved in the optical axis direction according to the movement of intermediate barrel 4 and the formation of cam groove 46, and the front lens group 8 can be moved in the optical axis direction according to the movement of intermediate barrel 4.

Therefore, the front lens group 8 can be moved in a manner different from that at the time of zooming, whereby appropriate focusing can be carried out.

As in the foregoing, without using cam barrels and the like other than the intermediate barrel 4, movable barrel 5, and straight barrel 7, the lens driving apparatus 1 in accordance with this embodiment can carry out zooming and focusing of the taking optical system composed of the front lens group 8 and rear lens group 9 through expanding and collapsing actions of the intermediate barrel 4 and movable barrel 5. Consequently, the cost of the apparatus as whole can be cut down, and the apparatus can be made smaller.

Though this embodiment relates to a lens driving apparatus holding the front lens group 8 when the movable barrel 5 is switched from expanding to collapsing, the lens driving apparatus in accordance with the present invention is not restricted thereto, and it may be one holding the front lens group 8 when the movable barrel 5 is switched from collapsing to expanding.

Second Embodiment

A lens driving apparatus in accordance with a second embodiment will now be explained.

The lens driving apparatus 1 in accordance with the first embodiment moves the front lens group 8 together with the movable barrel 5 upon magnification changing actions, and together with the intermediate barrel 4 upon focus adjusting actions. In the lens driving apparatus 1a in accordance with the second embodiment, by contrast, the rear lens group 9 is moved by way of a cam mechanism as the intermediate barrel 4 moves upon magnification changing actions, and the rear lens group 9 is moved together with the intermediate barrel 4 upon focus adjusting actions.

FIG. 6 shows the lens driving apparatus in accordance with the second embodiment.

In the lens driving apparatus 1a in accordance with this embodiment, as depicted, the fixed barrel 3 is disposed in the camera body 2, and the intermediate barrel 4 and movable barrel 5 are configured so as to be expandable from and collapsible into the fixed barrel 3 as in the lens driving apparatus 1a in accordance with the first embodiment.

The front lens group 8 is fixed to the movable barrel 5, and is movable along the optical axis O as the movable barrel 5 expands and collapses. The movable barrel 5 is expanded and collapsed by way of a helicoid mechanism between the movable barrel 5 and intermediate barrel 4.

As the intermediate barrel 4 expands, the rear lens group 9 is moved forward along the optical axis O by way of the cam mechanism. The rear group lens frame 91 is formed with a groove 93 extending in the optical axis direction, whereas a lug 111 is inserted in the groove 93. The lug 111 extends inward from the inner peripheral surface of a barrel 11 disposed between the straight barrel 7 and movable barrel 5. The barrel 11 is engaged with the movable barrel 5, so as to be restrained from rotating about the optical axis O while being allowed to move only linearly in the optical axis direction. The outer peripheral surface of barrel 11 is provided with a cam follower 112. The cam follower 112 projects outward from the outer peripheral surface of barrel 11 and is inserted in a cam groove 46 formed in the inner peripheral surface of intermediate barrel 4. Consequently, as the intermediate barrel 4 expands, the barrel 11 moves forward while tracking the cam groove 46, whereby the rear lens group 9 moves along the optical axis O as the barrel 11 moves.

On the other hand, the rear lens group 9 moves together with the intermediate barrel 4 when the latter collapses. The rear group lens frame 91 is formed with a vertical hole 94 accommodating a click ball 84. The click ball 84 is urged outward by a spring 95 contained in the vertical hole 94, so as to be pressed against the inner peripheral surface of straight barrel 7. If the click ball 84 fits into a recess 72 of the straight barrel 7, then the rear lens group 9 is held by the intermediate barrel 4 by way of the rear group lens frame 9 and straight barrel 7 due to the click ball 84 and recess 72. As a consequence, the rear lens group 9 moves together with the intermediate barrel 4 when the movement of intermediate barrel 4 is reversed.

Thus, as with the lens driving apparatus 1 in accordance with the first embodiment, the lens driving apparatus 1a in accordance with the second embodiment can carry out zooming and focusing of the taking optical system composed of the front lens group 8 and rear lens group 9 through expanding and collapsing actions of the intermediate barrel 4 and movable barrel 5. Consequently, the cost of the apparatus as a whole can be cut down, and the apparatus can be made smaller.

Though this embodiment relates to a lens driving apparatus holding the front lens group 8 when the intermediate barrel 4 is switched from expanding to collapsing, the lens driving apparatus in accordance with the present invention is not restricted thereto, and it may be one holding the front lens group 8 when the intermediate barrel 4 is switched from collapsing to expanding.

As explained in the foregoing, since the present invention comprises holding means for holding a first or second lens so as to move it together with a first barrel when the movement of the first or second barrel is reversed, the distance between the first and second lenses can be changed between the expanding and collapsing of the first and second barrels, whereby the focus can be adjusted. If this holding means is configured so as to accompany an existing component, then the number of components employed for changing the magnification and adjusting the focus can be reduced, whereby the apparatus as a whole can be made smaller at a lower cost.

What is claimed is:

1. A lens driving apparatus for moving at least two lens groups composed of first and second lenses along an optical axis to change magnification and adjust focus, said lens driving apparatus comprising:

a first barrel, expandable and collapsible in an optical axis direction, for moving the first lens in the optical axis direction in expanding and collapsing;

a second barrel, concentric with said first barrel, expandable and collapsible with respect to said first barrel along with expanding and collapsing of said first barrel, for moving said second lens in the optical axis direction when expanding from said first barrel; and holding means for holding said second lens when said second barrel is changed from expanding to collapsing, so as to move said second lens together with said first barrel.

2. The lens driving apparatus according to claim 1, wherein said holding means comprises an engaging member having a spherical part, and urging means for pressing said spherical part of said engaging member against a movable member moving together with said first barrel, so as to hold one of said first and second lenses by causing said spherical part to engage a groove in said movable member.

3. The lens driving apparatus according to claim 2, wherein said movable member is a straight member attached to said first barrel and moving in the optical axis direction together with said first barrel.

4. A lens driving apparatus for moving at least two lens groups composed of first and second lenses along an optical axis to change magnification and adjust focus, said lens driving apparatus comprising:

a first barrel, expandable and collapsible in an optical axis direction, for moving the first lens in the optical axis direction in expanding and collapsing;

a second barrel, concentric with said first barrel, expandable and collapsible with respect to said first barrel along with expanding and collapsing of said first barrel, for moving said second lens in the optical axis direction when collapsing into said first barrel; and holding means for holding said second lens when said second barrel is changed from collapsing to expanding, so as to move said second lens together with said first barrel.

5. A lens driving apparatus for moving at least two lens groups composed of first and second lenses along an optical axis to change magnification and adjust focus, said lens driving apparatus comprising:

a first barrel, expandable and collapsible in an optical axis direction, for moving the first lens in the optical axis direction in expanding;

a second barrel, concentric with said first barrel, expandable and collapsible with respect to said first barrel along with expanding and collapsing of said first barrel, for moving said second lens in the optical axis direction when expanding and collapsing with respect to said first barrel; and holding means for holding said first lens when said first barrel is changed from expanding to collapsing, so as to move said first lens together with said first barrel.

6. A lens driving apparatus for moving at least two lens groups composed of first and second lenses along an optical axis to change magnification and adjust focus, said lens driving apparatus comprising:

a first barrel, expandable and collapsible in an optical axis direction, for moving the first lens in the optical axis direction in collapsing;

a second barrel, concentric with said first barrel, expandable and collapsible with respect to said first barrel along with expanding and collapsing of said first barrel, for moving said second lens in the optical axis direction when expanding and collapsing with respect to said first barrel; and holding means for holding said first lens when said first barrel is changed from collapsing to expanding, so as to move said first lens together with said first barrel.

* * * * *